United States Patent
Wolff et al.

(10) Patent No.: US 6,907,735 B2
(45) Date of Patent: Jun. 21, 2005

(54) HYDROGEN FUELED ELECTRICAL GENERATOR SYSTEM AND METHOD THEREOF

(75) Inventors: David Wolff, South Windsor, CT (US); Antonio John Speranza, West Hartford, CT (US); Oscar Chow, Simsbury, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 0 days.

(21) Appl. No.: 10/064,895

(22) Filed: Aug. 27, 2002

(65) Prior Publication Data

US 2004/0040304 A1 Mar. 4, 2004

(51) Int. Cl.$^7$ .............................................. F02B 33/44
(52) U.S. Cl. ........................... 60/605.1; 60/651; 60/671
(58) Field of Search ............................. 60/605.1, 651, 60/671

(56) References Cited

U.S. PATENT DOCUMENTS

| | | | | |
|---|---|---|---|---|
| 3,799,124 A | * | 3/1974 | Swain | .................. 123/1 A |
| 4,062,184 A | | 12/1977 | Hagen | ................. 60/39.28 P |
| 4,253,428 A | * | 3/1981 | Billings et al. | .............. 123/1 A |
| 4,386,309 A | * | 5/1983 | Peschka | ..................... 322/2 R |
| 4,910,963 A | * | 3/1990 | Vanzo | ........................ 60/641.8 |
| 5,003,772 A | * | 4/1991 | Huber | ........................... 60/259 |
| 5,305,714 A | * | 4/1994 | Sekiguchi et al. | ............. 123/3 |
| 5,375,580 A | * | 12/1994 | Stolz et al. | .................. 123/527 |
| 5,540,208 A | | 7/1996 | Kikutani | ..................... 123/518 |
| 5,830,593 A | * | 11/1998 | Nielson | ....................... 429/38 |
| 6,347,719 B1 | | 2/2002 | Rosen et al. | ................ 202/4.14 |
| 6,365,289 B1 | * | 4/2002 | Lee et al. | ...................... 429/13 |
| 6,543,229 B2 | * | 4/2003 | Johansson | .................. 60/605.1 |

* cited by examiner

Primary Examiner—Hoang Nguyen
(74) Attorney, Agent, or Firm—Dave S Christensen

(57) ABSTRACT

A system and method are provided for generating electricity for use with liquid hydrogen storage facility. The system includes a liquid hydrogen storage tank with a pressure relief. An energy conversion device is connected to the pressure relief valve an converts the hydrogen into rotational energy to operate an electrical generator. Electricity created by the generator can be fed back to operate ancillary loads in the facility, or sold for use in a main electrical grid.

38 Claims, 2 Drawing Sheets

HYDROGEN FUELED ELECTRICAL GENERATOR SYSTEM AND METHOD THEREOF

BACKGROUND OF INVENTION

This disclosure relates generally to the generation of electricity at facilities storing liquid hydrogen, and especially relates to the use of boiled off waste hydrogen gas as a fuel to generate electricity.

Hydrogen has many uses in industrial and energy applications. In many applications, it is desired to store hydrogen in its liquid form to minimize the amount of space required for storage tanks. Since liquid hydrogen is a cryogenic fluid, having a boiling point below 259° C., even when stored in vacuum-jacketed tanks, the hydrogen will evaporate, or "boil-off" at a fairly constant rate.

Standard liquid hydrogen tanks are fitted with pressure-relief valves which maintain gas pressure from the boil-off below a predetermined safe working level of the tank. Once this pressure is reached, the valve opens and vents the hydrogen gas to the atmosphere. By allowing the hydrogen gas to vent to the atmosphere, a considerable amount of energy, both chemical and kinetic, are lost.

It is estimated that a well maintained liquid hydrogen storage tank losses approximately 1% of its liquid hydrogen capacity each day due to boil-off hydrogen gas. For a 15,000 gallon tank, this translates to 17,000 standard cubic feet (scf) of hydrogen gas per day which is the energy equivalent to nearly 45 gallons of gasoline.

Several concepts have been proposed to recover the boil-off gas by recirculation of the gas into the liquification processing plant to convert the gas back into a liquid phase. While still others have suggested using the boil-off gas as a fuel for use with hydrogen powered vehicles. Both of these ideas have some merit, but also suffer from substantial drawbacks due to the limited number of locations where these concepts would be applied. Reliquification would only be feasible for gas recovered at the processing plant. Often, however, the liquid hydrogen is stored remotely from the processing plant, such as at distant industrial gas depot closer to the end-users. In these cases it would be impractical at best to return recovered gas to the liquification facility.

Using recovered hydrogen gas to power vehicles would seem like an excellent use for a product that would otherwise be disposed. However, at the present time, and for the foreseeable future, there are only a small number of these vehicles available. This combined with the fact that industrial gas depots tend to be located in industrial areas making it inconvenient for the owners of these vehicles to refill their vehicles. Furthermore, the hydrogen gas would need additional compression storage equipment to make it usable as fast fill fueling station for vehicles. These additional equipment requirements would add to the cost and further reduce the benefits of using the waste gas.

What is needed in the art is a system for recapturing some of the energy lost during the storage of liquid hydrogen and transforming the energy into a useful form for use by the storage facility.

SUMMARY OF INVENTION

Disclosed herein are electrical generation systems for use at liquid hydrogen storage facilities and methods for use thereof. An exemplary embodiment of the electrical generation system comprises: a liquid hydrogen storage tank with a valve. A hydrogen conversion device fluidly connected to the valve, and an electrical generator coupled to the hydrogen conversion device to create the electricity.

Another embodiment of the electrical generation system comprises: a liquid hydrogen storage tank having a pressure relief valve. An expansion engine is connected to the pressure relief valve with a hydrogen conversion device fluidly connected to the pressure relief valve. An electrical generator coupled to the hydrogen conversion device creates the electricity.

One embodiment for operating an electrical generation system for use with liquid hydrogen storage facilities comprises: storing liquid hydrogen in a storage tank, capturing boiled off hydrogen gas from the storage tank, storing the hydrogen gas, fueling a hydrogen conversion device with the hydrogen gas and, generating electricity with the hydrogen conversion device.

An alternate embodiment a system for operating a pump system comprises: a liquid hydrogen storage tank fluidly connected to a hydrogen conversion device. At least one pump is connected to the hydrogen conversion device such that the pump is operated and driven by the hydrogen conversion device.

The above discussed and other features will be appreciated and understood by those skilled in the art from the following detailed description and drawings.

BRIEF DESCRIPTION OF DRAWINGS

Referring now to the drawings, which are meant to be exemplary and not limiting, and wherein like elements are numbered alike.

DETAILED DESCRIPTION

Hydrogen gas is a versatile material having many uses in industrial and energy applications ranging from the production of ammonia, to powering vehicles being propelled into space. Hydrogen can be stored either as a gas or a liquid. When stored as a gas, the hydrogen is typically compressed to minimize the size of the storage tanks required. When large amounts of hydrogen are required for an application, it is not uncommon for the hydrogen to be stored in its liquid form since, due to its higher density, a given storage tank can hold multiple times the amount of liquid hydrogen than an equivalent amount in compressed hydrogen.

The process for liquefying hydrogen is an energy intensive operation. The process involves cooling the gaseous hydrogen to below its boiling point at 259.2° C. After liquification, the hydrogen must be stored in special vacuum jacketed tanks to minimize boil-off of the hydrogen. To minimize the buildup of boiled gas, a pressure relief valve to connected to the tank to allow venting of the hydrogen.

Figure 1:
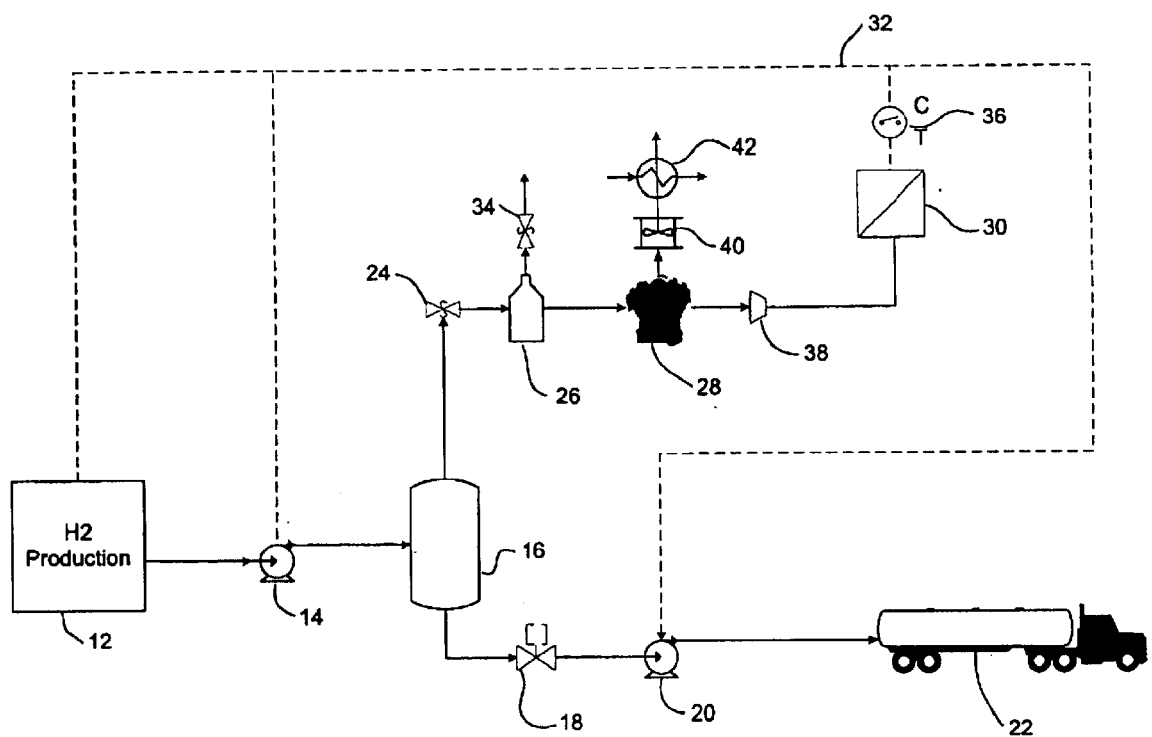
FIG. 1 is a schematic diagram illustrating a system for generating electricity at a liquid hydrogen storage facility; and, FIG. 2 is a schematic diagram illustrating an alternate embodiment of a system for generating electricity at a liquid hydrogen storage facility.

Since liquid hydrogen production and storage operations need to have many pumps and ancillary devices, a reliable electrical power system must be provided. It can be appreciated that the unexpected loss of power in such a facility can result in a large economic loss due to the loss of hydrogen. A system 10 for providing electricity to a liquid hydrogen storage facility is shown in FIG. 1.

A hydrogen production process 12 creates hydrogen from any number of methods known in the prior art, these processes include, but are not limited to: steam methane reformation, coal gasification, partial oxidation of hydrocarbons, biomass gasification, electrolysis and photobiological methods. The gaseous hydrogen is converted into liquid form and moved by a pump 14 to a liquid hydrogen storage vessel 16. It should be appreciated by those skilled in the art that while the storage tank 16 is illustrated as a single tank for purpose of example, any number of tanks or configurations of tanks may utilized depending on the size of the facility. Additional, ancillary equipment such as distribution manifolds, pumps and control equipment well known to those skilled in the art may also be utilized, but for the purpose of clarity are not illustrated.

After the liquid hydrogen is stored in the tank 16, it can then be removed by additional valves 18 and pumps 20 for use in a manufacturing process, or into a tube trailer 22 for delivery to another site.

A relief valve 24 is connected to the tank 16 and sized to allow boil-off hydrogen gas to be vented from the tank at a predetermined pressure. Once the gas leaves the valve 24, it enters a buffer tank 26 which temporarily stores the hydrogen gas until it is used by the hydrogen conversion device 28 to operate an electric generator 38 which creates electricity for use by the facility. While the invention contemplated herein is intended to use all the boiled off gas with the buffer tank being sized appropriately for the application, there may be environmental or other conditions that exist that would cause excess hydrogen gas to be generated. To prevent over-pressurization, additional pressure relief valves 34 may be coupled to the buffer tank 26 to vent the excess gas to the atmosphere.

Electricity from the hydrogen conversion device 28 will typically be conditioned by a power conditioner 30 prior to being used on the electrical grid 32. Switches 36 may also be incorporated to connect and disconnect the generated power from the grid. It should be appreciated that the system 10 could also be used as a traditional backup for primary power. By sizing the buffer tank appropriately, a volume of hydrogen gas can be stored in reserve in the event power fails. The reserved hydrogen in the buffer tank would then be consumed until primary power returns. This may be especially advantageous for small production facilities that may not produce enough boil-off gas to continuously operate a hydrogen conversion device 28.

For purposes herein, the term hydrogen conversion device 28 refers to any device which converts hydrogen gas into mechanical energy. Examples of hydrogen conversion devices include, but are not limited to, internal combustion engines, gas turbine engines, expansion engines, and stirling engines. Each of these devices uses a different means for converting the hydrogen into mechanical energy. The internal combustion engine uses the hydrogen gas as a fuel to burn inside a cylinder. The expanding gases drive a piston to create rotational motion about a crankshaft. In the event that a given facility does not produce enough hydrogen fuel to continuously operate an internal combustion, gas turbine, or stirling engine, the hydrogen gas can be mixed with other petroleum based fuels such as natural gas, propane or diesel fuels prior to combustion. By utilizing a mixture of up to 30% hydrogen as fuel, pollution emissions produced by the engine can be greatly reduced.

A Stirling engine, however, is a closed-cycle, regenerative heat engine which uses the hydrogen as a fuel in an external combustion process. The engine, through the use of heat exchangers, pistons, a 'regenerator' and a gaseous working fluid contained within the engine work to convert heat to mechanical energy. Stirling engines, while being generally more complex than the internal combustion engine are more efficient, and generally produce lower amounts of pollution.

An expansion-engine, or turboexpander as it is sometimes called, does not burn the hydrogen as a fuel. Instead, the expansion engine incorporates a turbine that acts against the pressurized gas. As the pressure of the hydrogen gas is lowered, the gas expands and releases kinetic energy. This kinetic energy is captured by the turbine to create rotational mechanical energy. As will be described in more detail herein, since the hydrogen gas is not burned, the expansion engine can be used in conjunction to other types of energy to allow maximum extraction of energy from the boil-off gas.

To create electricity, the hydrogen conversion devices generally translate the mechanical energy into rotational motion that is used to drive an electrical generator 38. Other types of generators which use electrochemical processes, such as a fuel cell can also be used in this system to create electricity directly.

In addition to generating electricity, some of the hydrogen conversion devices, such as the internal combustion engine and the sterling engine create waste heat in their exhaust 40. When combined with a heat exchanger 42, the waste heat can be captured and used by the facility 10 for other purposes, such as hot water, heating or for other industrial processes.

Figure 2:
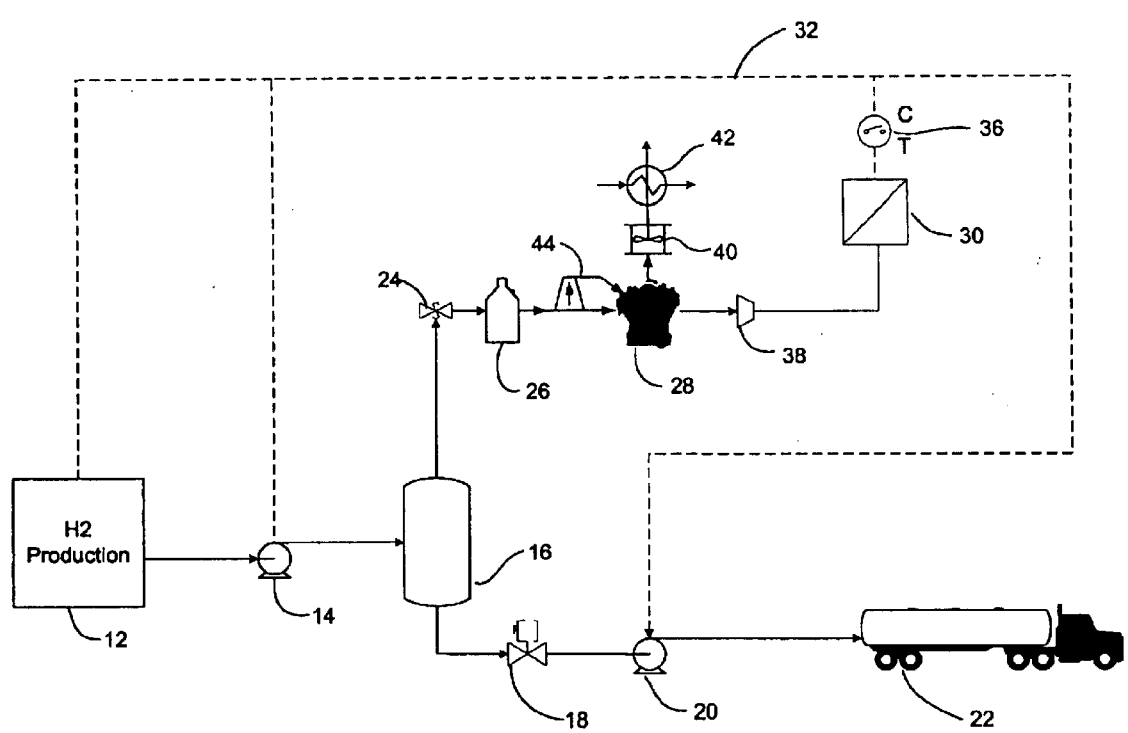

An alternate embodiment of this system is shown in FIG. 2. In this embodiment, an expansion engine 44 is connected in the hydrogen gas flow before the hydrogen conversion device. Since most hydrogen conversion devices do not require pressurized hydrogen, the expansion engine 44 can be utilized to extract energy from the hydrogen gas while reducing the pressure. The energy extracted from the expansion engine can be used to drive a generator 38 as described herein above, or to drive ancillary loads such as a turbocharger on the internal combustion engine generator 28.

In operation, medium volume production hydrogen liquification plants create hydrogen at a rate of 250 to 5000 lb/hr, which is stored in vacuum jacketed tanks 16. As described herein above, boiled off hydrogen gas from the tank 16 exits through relief valve 24. Depending on the size of the tank and environmental conditions, the rate that the gas leaves the tank between 2 standard cubic feet per hour (scf/hr) and 4000 scf/hr. For an internal combustion engine capable of generating between 1 kW and 10 kW of electricity, the preferred rate of hydrogen would be 40 scf/hr to 400 sch/hr. The preferred rate of hydrogen for a 5 kW internal combustion engine genset being generally 200 scf/hr. Thus, a hydrogen storage facility having a boil-off rate of 4000 scf/hr, would be able to continually operate 20 5 kW generators to produce 100 kW of electricity. It can be appreciated that large hydrogen storage facilities may be able to produce more electricity than it needs and the facility may be able to sell any excess electricity back to the utility thus providing power to the main electrical grid or to a backup power system.

Bulk hydrogen production facilities require numerous pumps to move both hydrogen and precursor materials during processing. In an alternate embodiment, the rotational energy created by either the internal combustion engine, gas turbine, sterling engine or expansion engine could be used to directly operate the pumps. This embodiment provides the added advantage of eliminating the electric generator and the pump motor, simplifying the system and increasing reliability.

While FIGS. 1–2 show a hydrogen production facility, this is for example purposes only, and is not meant to be limiting. This system 10 would be equally applicable to a facility that acts only as depot receiving periodic supplies of liquid hydrogen from the liquification facility. Application of this system to depots, or other facilities remote from the liquification process are considered to be within the scope of this invention.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for generating electricity comprising:
   storing liquid hydrogen in a storage tank;
   removing liquid hydrogen from a first location in said storage tank;
   capturing boiled off hydrogen gas from a second location in said storage tank;
   storing said hydrogen gas in a second tank;
   venting said captured hydrogen gas from said second tank if said captured hydrogen gas pressure exceeds a threshold;
   fueling a hydrogen conversion device with said stored hydrogen gas; and,
   generating electricity with said hydrogen conversion device.

2. The method of claim 1 wherein said hydrogen conversion device is an internal combustion engine.

3. The method of claim 2 further comprising the step of collecting waste heat from said internal combustion engine.

4. The method of claim 1 wherein said hydrogen conversion device is an expansion engine.

5. The method of claim 1 wherein said hydrogen conversion device is a sterling engine.

6. The method of claim 5 further comprising the step of collecting waste heat from said sterling engine.

7. The method of claim 1 wherein said hydrogen conversion device is provided hydrogen gas at a rate between 2 scf/hr and 4000 scf/hr.

8. The method of claim 7 wherein said hydrogen conversion device is provided hydrogen gas at a rate between 40 scf/hr and 400 scf/hr.

9. The method of claim 8 wherein said hydrogen conversion device is provided hydrogen gas at a rate of 40 scf/hr.

10. The method of claim 1 further comprising the slop of generating liquid hydrogen.

11. A method for generating power in a liquid hydrogen storage facility having ancillary and control equipment comprising:
    storing liquid hydrogen in a storage tank;
    removing liquid hydrogen from a first location in said storage tank;
    capturing boiled off hydrogen gas from a second location in said storage tank;
    storing said captured hydrogen gas in a second tank;
    operating a hydrogen conversion device fluidly coupled to said second tank with said captured hydrogen gas;
    generating electricity with said hydrogen conversion device;
    operating the ancillary and control equipment with said generated electricity.

12. The method of claim 11 wherein said hydrogen conversion device is an internal combustion engine.

13. The method of claim 11 wherein said hydrogen conversion device is an expansion engine.

14. The method of claim 11 wherein said hydrogen conversion device is a sterling engine.

15. The method of claim 14 further comprising the step of collecting water heat from said sterling engine.

16. An electrical generator system for use in a facility storing liquid hydrogen, said facility comprising:
    a liquid hydrogen storage tank;
    a liquid hydrogen removal valve connected to said storage tank;
    a pressure relief valve connected to said storage tank distal from said removal valve; and,
    a hydrogen conversion device fluidly connected to said pressure relief valve,
    wherein said hydrogen conversion device is downstream from said relief valve.

17. The electrical generator system of claim 16 further comprising an electrical generator coupled to said hydrogen conversion device.

18. The electrical generator system of claim 17 wherein said hydrogen conversion device is an internal combustion engine.

19. The electrical generator system of claim 17 wherein said hydrogen conversion device is an expansion engine.

20. The electrical generator system of claim 17 wherein said hydrogen conversion device is a Stirling engine.

21. The electrical generator system of claim 20 wherein said sterling engine includes an exhaust outlet and a heat collector adjacent its exhaust outlet, said heat collector transferring heat from said exhaust to another medium.

22. The electrical generator system of claim 17 further comprising a buffer tank connected to said pressure relief valve and said hydrogen conversion device.

23. The electrical generator system of claim 22 further comprising at least one pump connected to said liquid hydrogen storage tank and electrically connected to a utility electrical grid, said pump moving liquid hydrogen from the tank.

24. The electrical generator system of claim 23 wherein said pump is electrically connected to said electrical generator wherein said electrical generator provides electricity to said pump in the event that utility grid electricity is interrupted.

25. A method for generating electricity comprising:
    storing liquid hydrogen in a storage tank;
    removing liquid hydrogen from a first location in said storage tank;
    capturing boiled off hydrogen gas from a second location in said storage tank;
    storing said captured hydrogen gas in a second tank;
    rotating an expansion engine with said captured hydrogen gas;
    fueling a hydrogen conversion device with said captured hydrogen gas; and,
    generating electricity with said hydrogen conversion device.

26. The method of claim 25 wherein said hydrogen conversion device is an internal combustion engine.

27. The method of claim 26 further comprising the step of operating a turbocharger coupled to said expansion engine.

28. The method of claim 25 wherein said hydrogen conversion device is a Stirling engine.

29. An electrical generator system for use in a liquid hydrogen storage facility comprising:

a liquid hydrogen storage tank;

a liquid hydrogen removal valve connected to said storage tank;

a pressure relief valve connected to said storage tank distal from said removal valve; and, a hydrogen conversion device fluidly connected to said pressure relief valve opposite said liquid hydrogen storage tank;

an electrical generator coupled to said hydrogen conversion device; and, an expansion engine connected to said pressure relief valve.

30. The electrical generator system of claim 29 wherein said hydrogen conversion device is an internal combustion engine.

31. The electrical generator system of claim 30 wherein said expansion engine is connected to a turbocharger on said internal combustion engine.

32. A pumping system comprising:

a liquid hydrogen storage tank, said storage tanking including a liquid outlet and a gas outlet, said gas outlet being distal from maid liquid outlet;

a hydrogen conversion device fluidly connected to and arranged to receive gas from said tank gas outlet; and, at least one pump electrically connected to said hydrogen conversion device.

33. The pumping system of claim 32 wherein said hydrogen conversion device is an internal combustion engine.

34. The pumping system of claim 32 wherein said hydrogen conversion device is a gas turbine.

35. The pumping system of claim 32 wherein said hydrogen conversion device is a expansion engine.

36. A method for operating a pump comprising:

storing liquid hydrogen in a storage tank;

removing liquid hydrogen from a first location in said storage tank;

capturing boiled off hydrogen gas from a second location in said storage tank;

storing said hydrogen gas in a second tank;

fueling a hydrogen conversion device fluidly coupled to said second tank with said stored hydrogen gas; and, rotating at least one pump with said hydrogen conversion device.

37. The method of claim 36 wherein said hydrogen conversion device is an internal combustion engine.

38. The method of claim 37 further comprising the step of collecting waste beat from said internal combustion engine.

* * * * *

UNITED STATES PATENT AND TRADEMARK OFFICE
CERTIFICATE OF CORRECTION

PATENT NO. : 6,907,735 B2
DATED : June 21, 2005
INVENTOR(S) : Wolff et al.

It is certified that error appears in the above-identified patent and that said Letters Patent is hereby corrected as shown below:

Column 1,
Line 25, after "storage tank" delete "losses" and insert -- loses --.

Column 2,
Line 54, after "point at" delete "259.2º C" and add -- -259.2º C --.

Column 3,
Line 9, after "configurations of tasks may" insert -- be --.

Column 5,
Line 49, after "comprising the" delete "slop" and insert -- step --.

Column 7,
Line 25, after "being distal from" delete "maid" and insert -- said --.

Signed and Sealed this

Sixth Day of September, 2005

JON W. DUDAS
*Director of the United States Patent and Trademark Office*